United States Patent
Do Amaral Assy et al.

(10) Patent No.: US 9,775,282 B2
(45) Date of Patent: Oct. 3, 2017

(54) PARTICULATE METERING AND MIXING SYSTEM FOR AN AGRICULTURAL SOWING MACHINE

(71) Applicant: José Roberto Do Amaral Assy, Caldas Novas (BR)

(72) Inventors: José Roberto Do Amaral Assy, Caldas Novas (BR); Enrico Incao, São Paulo (BR); Silvio De Lacerda, São Paulo (BR)

(73) Assignee: Jose Roberto do Amaral Assy, Município de Caldas Novas (BR)

( * ) Notice: Subject to any disclaimer, the term of this patent is extended or adjusted under 35 U.S.C. 154(b) by 15 days.

(21) Appl. No.: 14/781,731

(22) PCT Filed: Mar. 31, 2014

(86) PCT No.: PCT/BR2014/000104
§ 371 (c)(1),
(2) Date: Oct. 1, 2015

(87) PCT Pub. No.: WO2014/161054
PCT Pub. Date: Oct. 9, 2014

(65) Prior Publication Data
US 2016/0044859 A1 Feb. 18, 2016

(30) Foreign Application Priority Data

Apr. 3, 2013 (BR) .......................... 1020130079766

(51) Int. Cl.
*A01C 7/04* (2006.01)
*A01C 7/06* (2006.01)
(Continued)

(52) U.S. Cl.
CPC ................ *A01C 7/128* (2013.01); *A01C 1/00* (2013.01); *A01C 7/04* (2013.01); *A01C 7/06* (2013.01); *A01C 7/16* (2013.01); *A01C 17/00* (2013.01)

(58) Field of Classification Search
USPC .................. 239/650, 668, 669, 681, 687–689
See application file for complete search history.

(56) References Cited

U.S. PATENT DOCUMENTS

| | | | | | |
|---|---|---|---|---|---|
| 722,111 A | * | 3/1903 | Jones | ...................... | A01C 17/00 239/656 |
| 790,266 A | * | 5/1905 | Sester | ...................... | A01C 3/06 239/660 |

(Continued)

FOREIGN PATENT DOCUMENTS

BR PI9701103-7 12/1998

OTHER PUBLICATIONS

International Search Report for PCT/BR2014/000104 Dated May 26, 2014.

*Primary Examiner* — Alicia Torres
(74) *Attorney, Agent, or Firm* — TraskBritt, P.C.

(57) ABSTRACT

A metering and mixing system of solid particulates for a rotary seed dispenser in agricultural equipment for sowing, wherein the rotary seed dispenser is mounted under a seed feeder. The rotary seed dispenser is driven at the bottom by a planter drive system, which provides rotation to a spinning disc provided with a number of calibrated orifices through which the seeds housed in the disc orifices fall on a given point of the agricultural equipment. The metering and mixing system of solid particulates includes a solid particulate feeder that is positioned between the seed feeder and the rotary seed dispenser.

7 Claims, 7 Drawing Sheets

(51) Int. Cl.
*A01C 7/16* (2006.01)
*A01C 17/00* (2006.01)
*A01C 7/12* (2006.01)
*A01C 1/00* (2006.01)

(56) References Cited

U.S. PATENT DOCUMENTS

| | | | | |
|---|---|---|---|---|
| 1,330,275 A * | 2/1920 | Osmundson | ............. | A01C 7/02 |
| | | | | 111/82 |
| 1,700,738 A * | 2/1929 | Kier | ............. | A01C 7/16 |
| | | | | 111/170 |
| 2,304,794 A * | 12/1942 | Bohmker | ............. | A01C 7/06 |
| | | | | 111/34 |
| 2,306,748 A * | 12/1942 | Peterson | ............. | A01C 7/04 |
| | | | | 222/288 |
| 2,379,724 A * | 7/1945 | Lanham | ............. | A01C 7/04 |
| | | | | 111/153 |
| 2,521,565 A * | 9/1950 | Carelock | ............. | A01C 17/00 |
| | | | | 239/656 |
| 2,596,898 A * | 5/1952 | Hoppes | ............. | A01C 7/06 |
| | | | | 111/173 |
| 2,656,951 A * | 10/1953 | Murphy | ............. | A01C 7/04 |
| | | | | 111/66 |
| 3,246,806 A * | 4/1966 | McBride, Jr. | ............. | A01C 9/08 |
| | | | | 221/265 |
| 3,730,395 A * | 5/1973 | Gallogly | ............. | A01C 7/081 |
| | | | | 111/130 |
| 3,848,772 A * | 11/1974 | Aanestad | ............. | A01C 7/16 |
| | | | | 111/34 |
| 4,106,703 A | 8/1978 | Magda | | |
| 4,453,866 A * | 6/1984 | Ryan | ............. | B65G 53/40 |
| | | | | 111/34 |
| 4,926,768 A | 5/1990 | Magda | | |

\* cited by examiner

PARTICULATE METERING AND MIXING SYSTEM FOR AN AGRICULTURAL SOWING MACHINE

The present invention relates to a metering and mixing system of particulate solids for seed rotary dispenser used in agricultural equipment designed for sowing.

As known by those skilled in the art, conventionally, rotary seed dispensers installed in agricultural machines specifically designed for sowing, more commonly known as "planters", usually comprise a tractor used as a driving unit of the sowing equipment, which, while being driven over the soil to be cultivated sequentially performs the following operations: a) furrows the soil; b) receives an adequate number of seeds at previously established spacing; and c) revolves the soil again to cover the seeds, now placed in the furrows.

These planters, in general, have a number of mechanisms to carry out the three basic steps described above; one of such mechanisms is the seed rotary dispenser, where the novelty aspect of the present invention lies and which will be defined later.

The seed rotary dispenser is essentially a tubular housing of circular cross-section of small height assembled underneath a small grain-feeding bin. The seed rotary dispenser is driven at the bottom by a miter gear coupled to the planter driving system which provides rotation to a spinning disc with a number of calibrated orifices (holes) and a ring mounted facing the disc and a passage opening through which the seeds, housed in the disc holes, fall at a given point of the device.

Some rotary dispenser models in conventional equipment, which belongs to the state of the art, have a radial organizer and expelling devices actuated by springs.

A seed rotary dispenser model, which belongs to the state of the art, is described in patent document PI9701103-7, of the same patent holder, filed on Feb. 27, 1997, under the title "Seed dosing system for planting cereals and leguminous plants."

Seeds deposited in the bin can receive several different treatments, all externally to the small bin, with liquid products and/or particulate solids for several purposes, mixed in mechanical and/or manual ways, which prepare them for sowing.

The holder of the present invention, constantly active in field and laboratory research, always with the objective of improving seed flow standardization during the progress of planting, carried out by planters, proposes a metering and mixing system of particulate solids, with the purpose of providing a treatment to the seeds before they are cast in the planting; where, for said function the system will be positioned between the grain bin and the rotary dispenser.

Thus, the present invention comprises a metering and mixing system whose function is to direct the seeds by gravity through the feed cone, which is to be positioned in the bin above, conveying the seeds to a cylindrical mixing compartment at the same time that particulate solids deposited at an input will be metered and conveyed by the rotary motion of a worm thread to the cylindrical mixing compartment; the seeds and the particulate solids will be mixed by a propeller which may be manufactured with rigid or flexible material, wherein both the worm thread and the propeller have their motion actuated by a gear set, which receives, in turn, the movement from a drive gear, which, coupled to the rotating disc with holes is driven by the miter gear, which is driven by the planter transmission system; and, after the mixing, these seeds now treated, are deposited neatly between the first and second feeding area of the rotary dispenser through the outlet window.

Next, this invention will be described with reference to the attached drawings, where.

Figure 1:
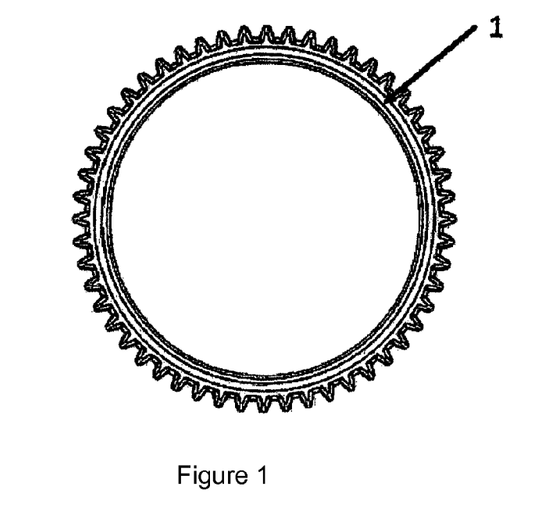
FIG. 1 presents a plan view of the drive gear that comprises the metering and mixing system, the object of this invention.
Figure 2:
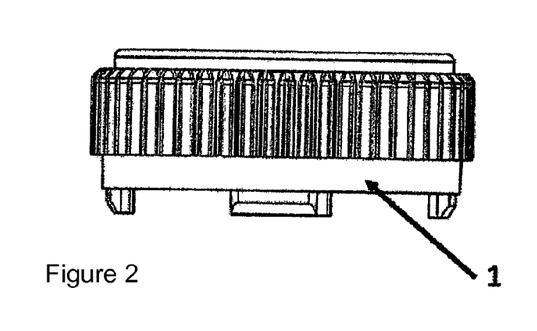
FIG. 2 presents an elevation view of the drive gear shown in FIG. 1.
Figure 3:
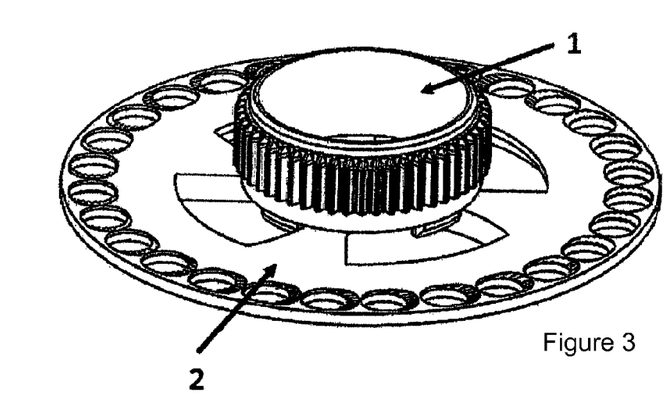
FIG. 3 presents a perspective view of the drive gear positioned to detect the movement of the rotary disc with holes.
Figure 4:
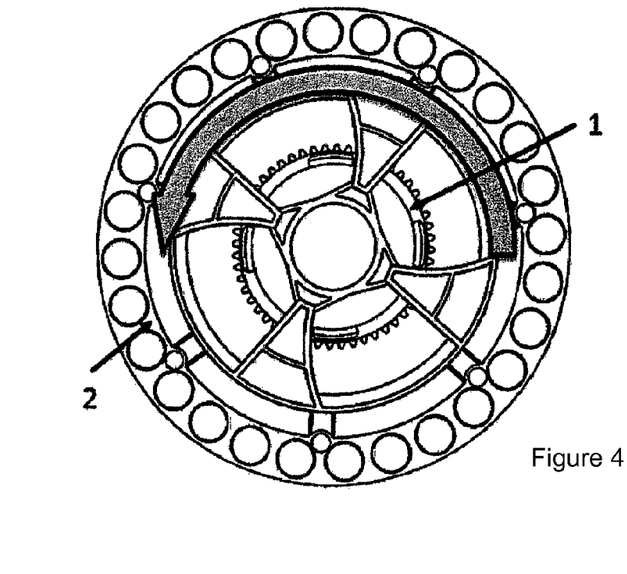
FIG. 4 presents a bottom view of the driving gear coupled to the rotary disc with holes.
Figure 5:
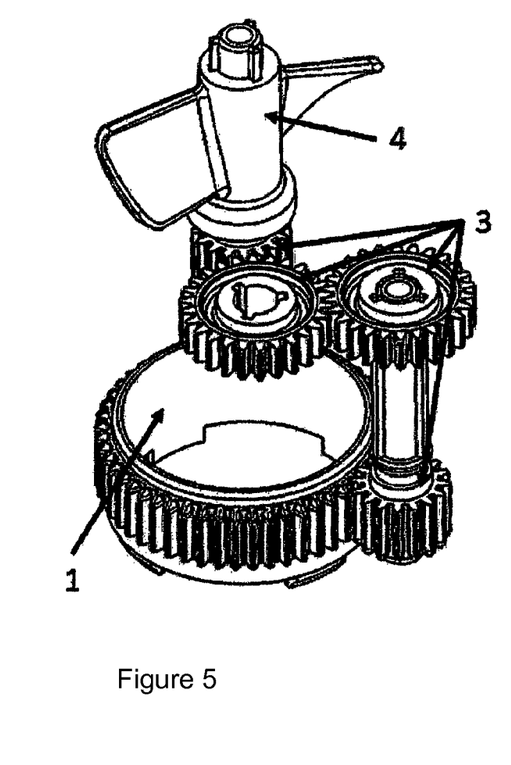
FIG. 5 presents a perspective view of the gear set that transmits the movement to the mixer propeller of the system, the object of the present invention.
Figure 6:
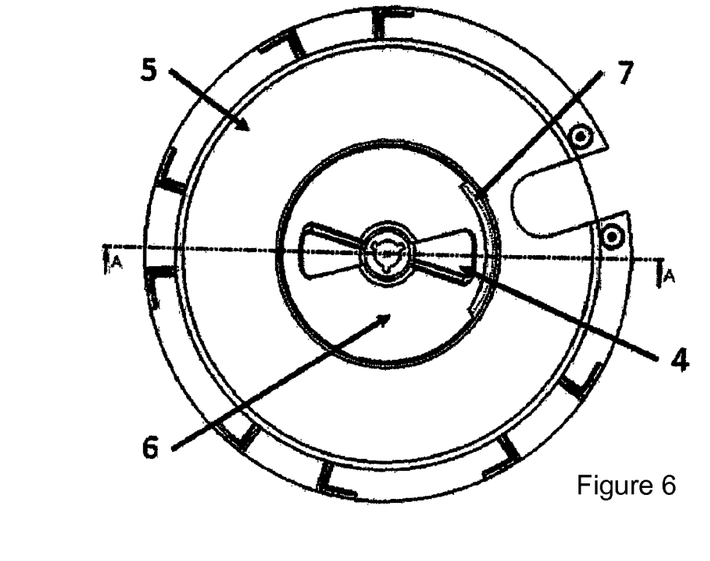
FIG. 6 presents a top view of the feed cone of the mixer with the propeller, the outlet window for seeds and the cylindrical mixing compartment of the mixer.
Figure 7:
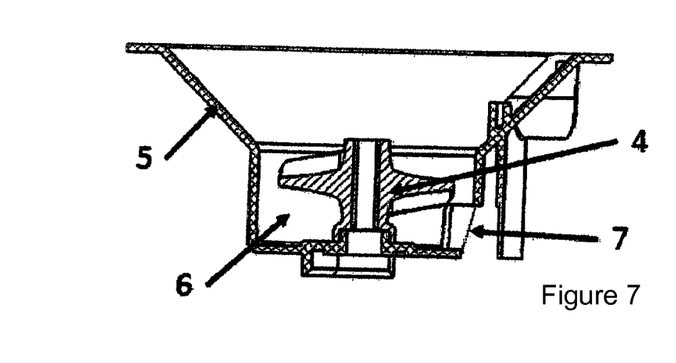
FIG. 7 presents a section view of the cone taken according to the line A-A of FIG. 6, illustrating the relative arrangement of the propeller, the outlet window for seeds and the cylindrical mixing compartment of the mixer.
Figure 8:
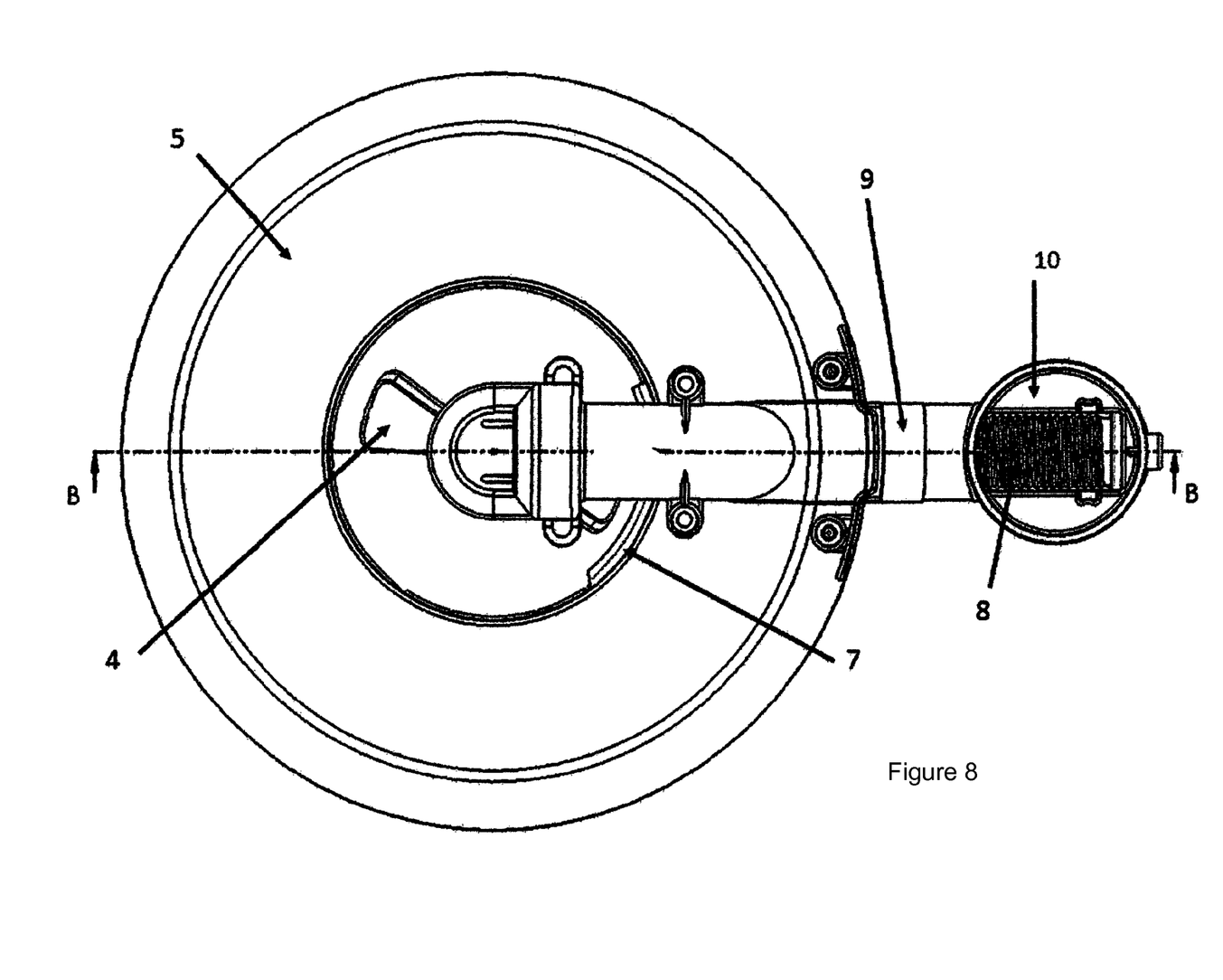
FIG. 8 presents a top view of the mixer feed cone, illustrating the propeller, the body of the metering dispenser, fitted with an opening for feeding the particulate solids, the worm thread of the metering dispenser and the outlet window of seeds already treated.
Figure 13:
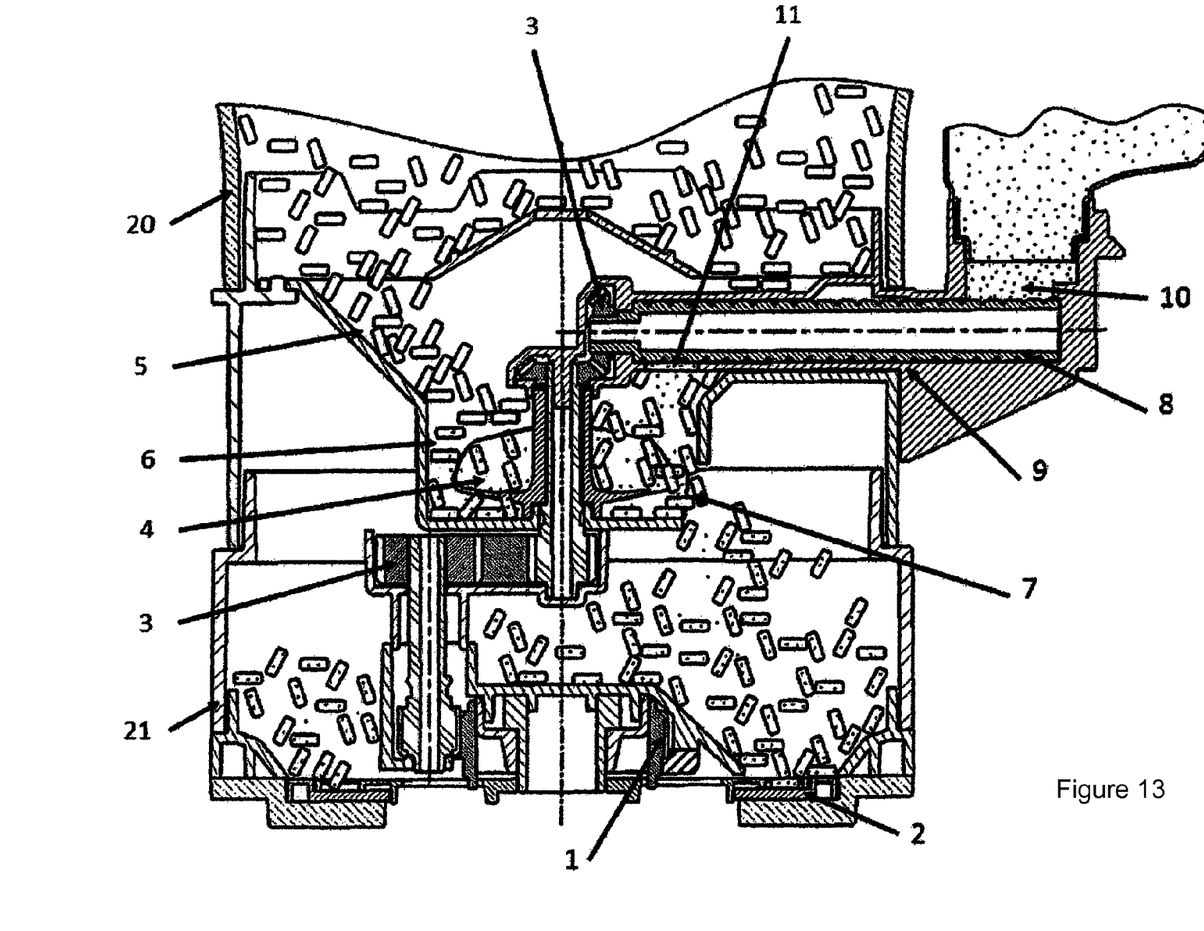
FIG. 13 presents a radial elevation section view of the metering and mixing system, the object of the present invention, illustrating in an schematic way all the metering operation and the treatment of seeds before they are released into the sowing line.

According to these illustrations, the metering and mixing system of particulate solids for a seed rotary dispenser used in agricultural equipment for sowing, the object of the present invention, is comprised by a feed cone (5) positioned between the seed (grains) bin (20) installed above, and the cylindrical mixing compartment (6) positioned below, built or not into the feed cone (5). Radially to this feed cone (5) a feed body (9) is provided, defined by a tubular part, into which a spindle or worm thread (8) is provided, whose function is to convey the particulate solids deposited through an end input (10) of such tubular body (9) and through the tubular body (9) until said particulate solids reach the cylindrical mixing compartment (6), see FIGS. 9 and 13, where the seeds will be mixed by a propeller (4) which can be manufactured with rigid or flexible material. Both the worm thread (8) and the propeller (4) have their movement transmitted through the gear set (3), see FIGS. 5 and 9, which, in turn, receives the movement from a driving gear (1), mounted coaxially and internally to the seed dispenser container (21), see FIG. 13. This driving gear (1), see FIGS. 3 and 4, is axially coupled to the rotating disc with holes (2) and is driven by the miter gear which, in turn, is driven by the planter transmission system (not illustrated). After being mixed, the seeds are deposited neatly between the first (12)

and the second (13) supply area of the rotary dispenser (21) through the outlet window (7) of the cylindrical mixing compartment (6), see FIGS. 7 and 13.

Figures 9, 10:
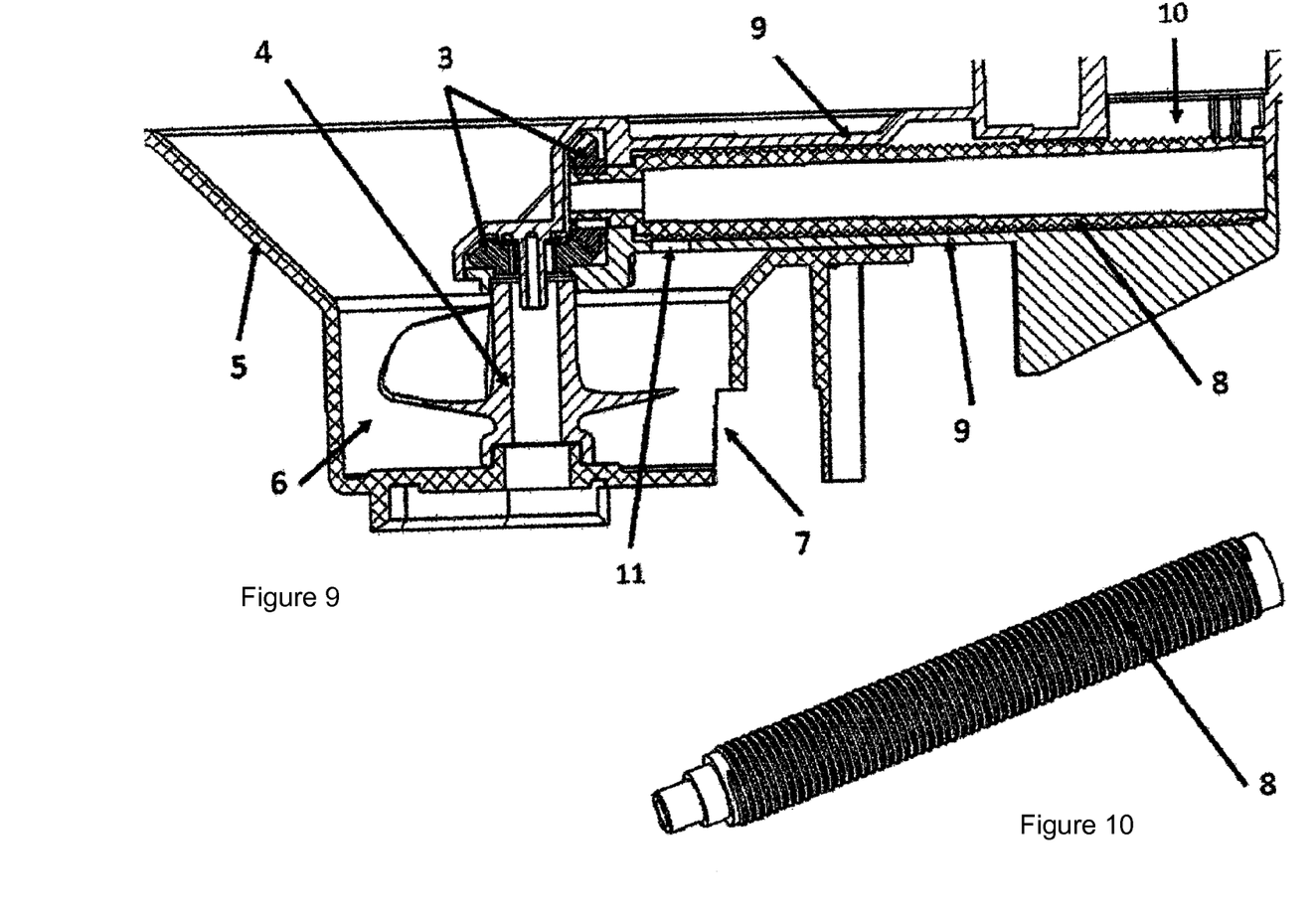
FIG. 9 presents an elevation and section view, according to line B-B of FIG. 8.
FIG. 10 presents a perspective view of the worm thread.

Therefore, as can be seen in FIGS. 9 and 13, the respective gear set (3) causes the worm thread (8) to rotate, in order to meter and convey the preset amount of solid particles along the body of the metering device (9), between the feeding area (10) of the particulate solids and the outlet window of particulate solids (11), where said solid particles fall into the cylindrical mixing compartment (6); and the propeller (4), which rotates inside such cylindrical mixing compartment (6), is responsible for mixing the seeds, which come from the seed bin (20), with the particulate solids introduced into the cylindrical mixing compartment (6), as mentioned above.

Figure 11:
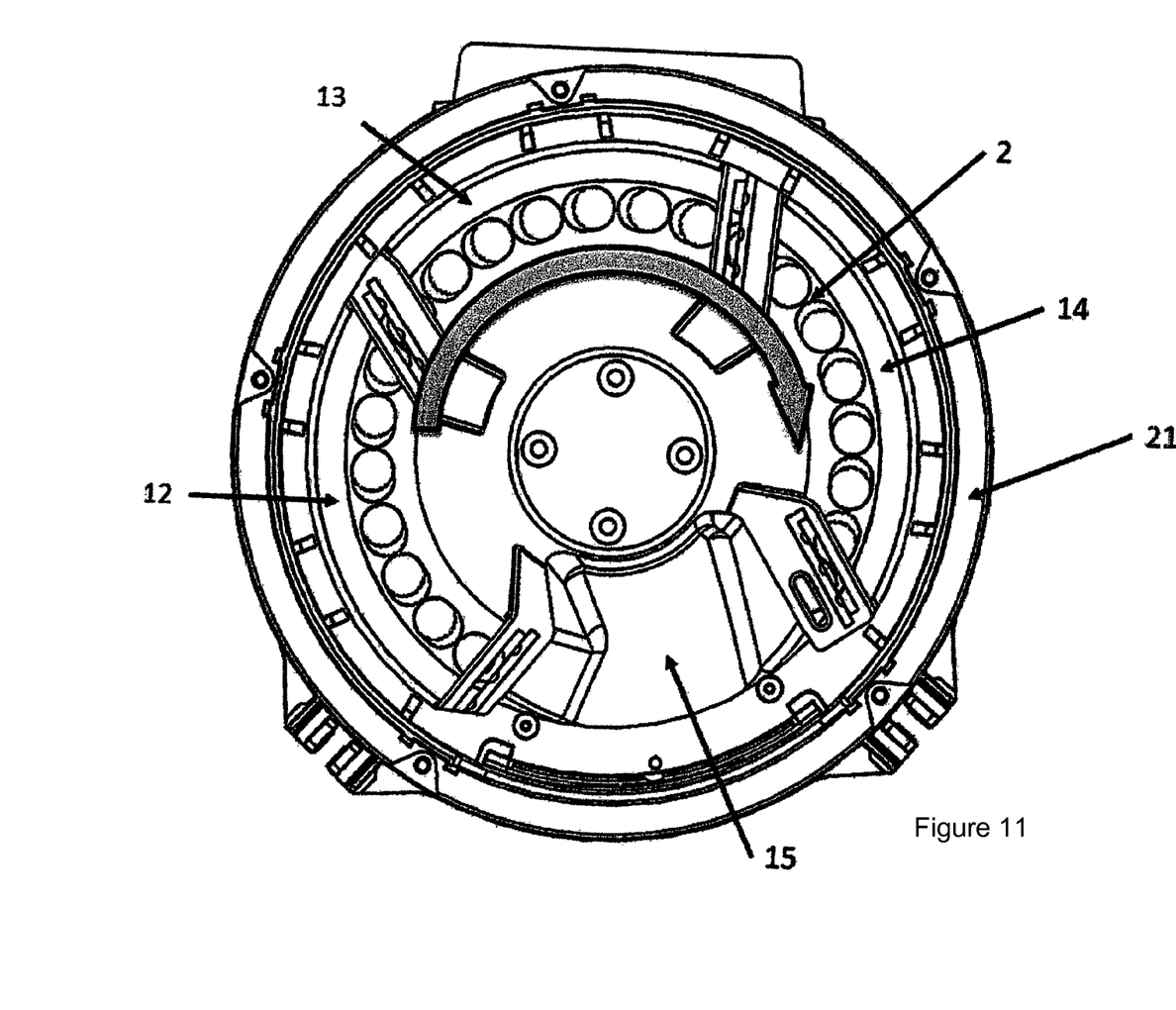
FIG. 11 presents a top view of the seed rotary dispenser, representing the state of the art and known by the patent PI9701103-7 of the same holder.
Figure 12:
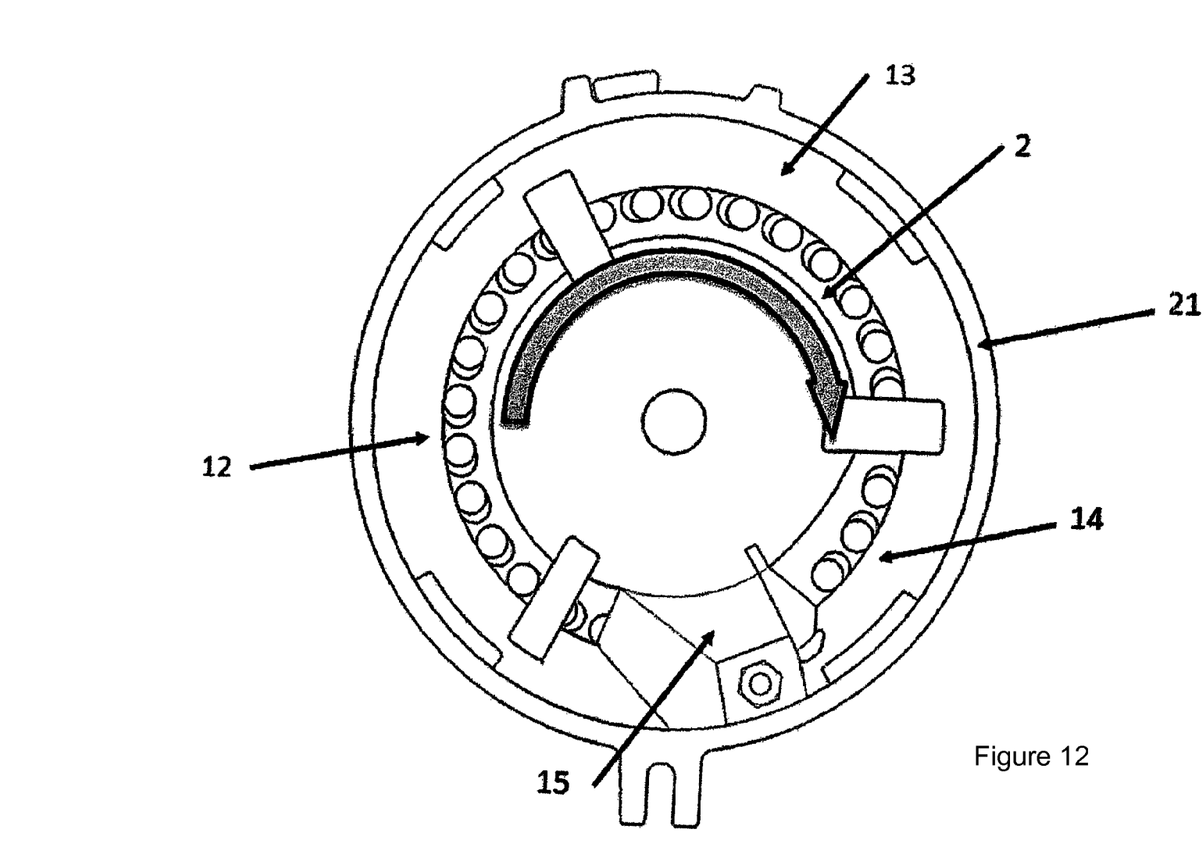
FIG. 12 presents a top view of the seed rotary dispenser in conventional equipment, which has a radial organizer, and seed expelling devices, actuated by springs.

With such configuration provided by the present invention, the assembly of the solid mixer set relative to the seeds rotating dispenser, according to FIGS. 11, 12 and 13, allows that the seeds are already mixed or superficially impregnated with the solid particles, when passing through the last organizer.

Despite a preferable embodiment of the metering and mixing system of particulate solids and seeds, assembled in a seed metering dispenser has been described and illustrated herein, it is important to mention that such construction herein defined for its components may and will foreseeable be used in a separated way in other dispensers, and such applications may use different mounting and retaining means such as bolts, clips, and other fittings, among other types of fasteners.

The invention claimed is:

1. A metering and mixing system of solid particulates for a seed meter in an agricultural equipment for sowing comprising a drive system, wherein the seed meter is mounted under a seed feeder, the seed meter is driven by the drive system that provides rotation to a spinning disc provided with several calibrated orifices through which seeds housed in the disc orifices fall on a given point of the agricultural equipment, and wherein the metering and mixing system of solid particulates comprises a solid particulate feeder that is positioned between the seed feeder and the seed meter, the metering and mixing system further comprising a cylindrical mixing compartment positioned between the seed feeder and the seed meter, the system further comprising a feed receiver mounted under the seed feeder and over the cylindrical mixing compartment, the feed receiver configured for conveying the seeds by gravity from the seed feeder to the cylindrical mixing compartment; and wherein the solid particulate feeder comprises a radial solid particulate feeder configured to convey solid particulates to the cylindrical mixing compartment simultaneously with the seeds, where, by means of a propeller, the seeds and solid particulates are mixed together; and, after mixing these seeds with the solid particulates, the seeds mixed with the solid particulates are deposited neatly in feeding areas of the seed meter through an outlet window of the cylindrical mixing compartment.

2. The system according to claim 1, wherein the feed receiver comprises a feed cone and the cylindrical mixing compartment and the feed cone are formed integrally, as a single piece.

3. The system according to claim 1 wherein the feed receiver comprises a feed cone and the cylindrical mixing compartment is coupled to the feed cone.

4. The system according to claim 1, wherein the radial solid particulate feeder comprises a tubular part in which a screw or worm thread is provided, which conveys through the tubular body the solid particulates deposited through an end inlet of such tubular body up to an outlet, at the opposite end of said tubular body, provided inside the cylindrical mixing compartment.

5. The system according to claim 4, wherein the propeller and the screw or worm thread inside of the corresponding tubular body have their movements transmitted by a set of gears which, in turn, receive the movement from a driving gear, mounted coaxially and internally to the seed meter.

6. The system according to claim 1, wherein a drive gear is coupled axially to the spinning disc with orifices and is moved by a miter gear, which is driven by the drive system.

7. The system according to claim 1, wherein a first feed area and a second feed area of the seed meter are configured to receive the seeds mixed with the solid particulates through the outlet window of the cylindrical mixing compartment.

* * * * *